Nov. 7, 1950  T. W. JONES ET AL  2,528,886
BEET TOPPING ATTACHMENT FOR TRACTORS
Filed March 20, 1948  2 Sheets-Sheet 2
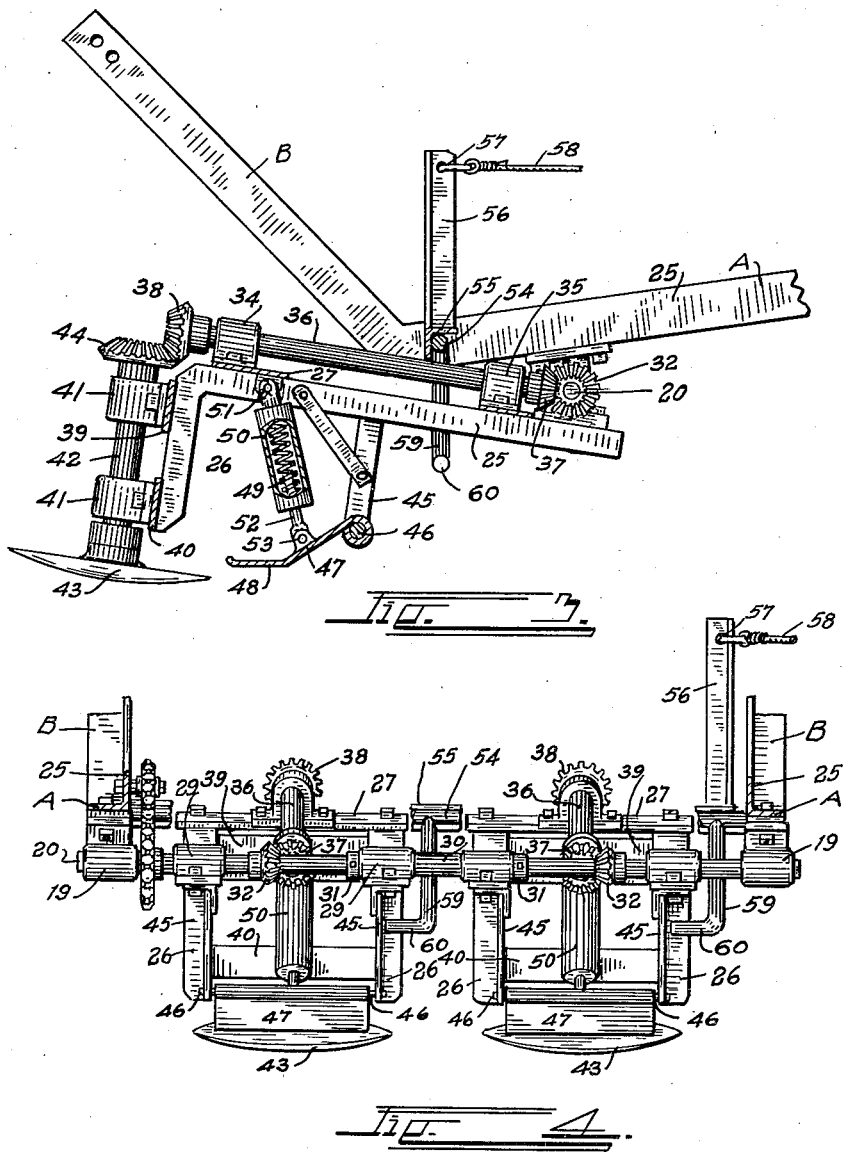
INVENTORS.
TAZE W. JONES
GEORGE M. LOVELAND.
BY Martin E. Anderson
ATTORNEY.

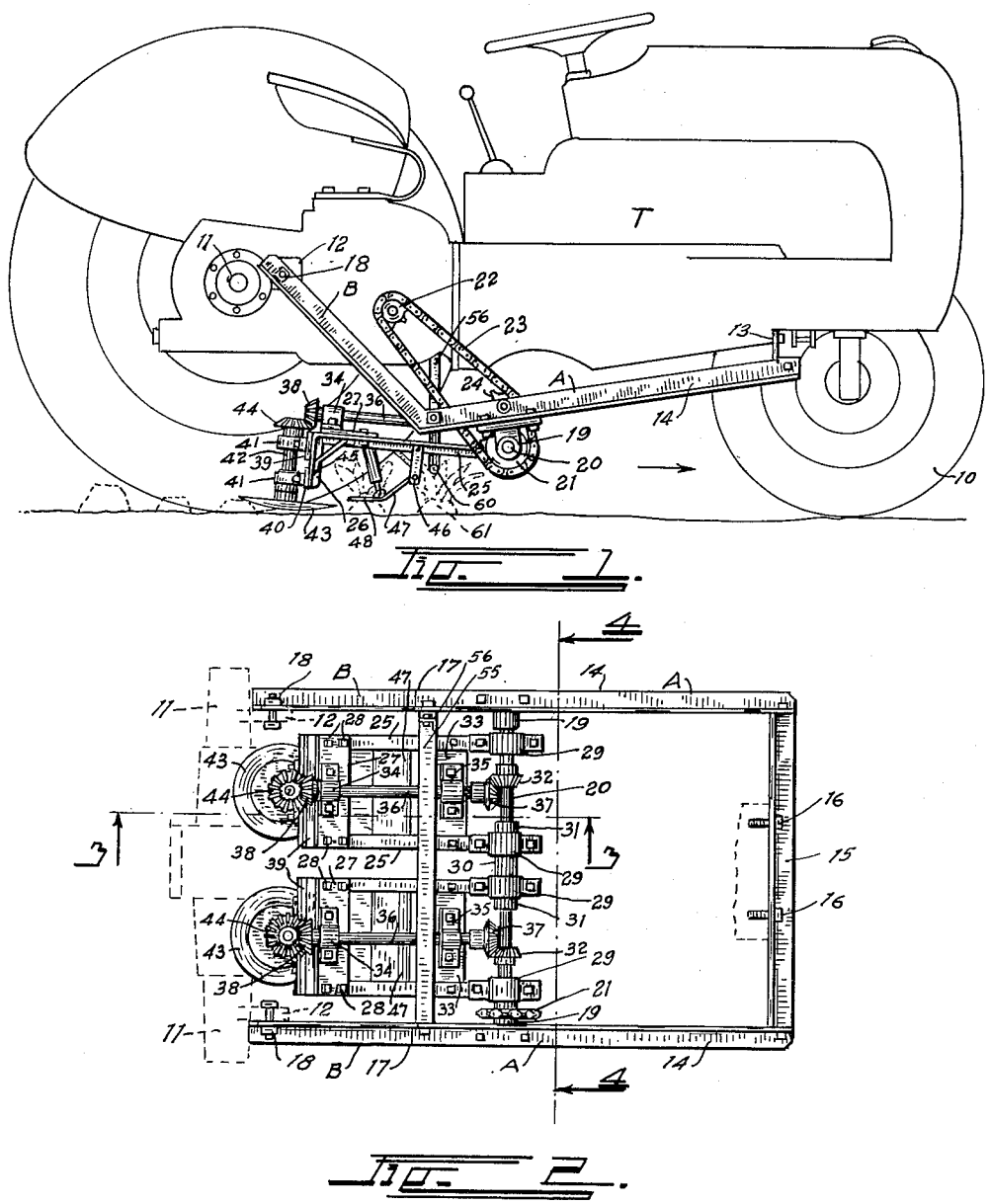

Patented Nov. 7, 1950

2,528,886

UNITED STATES PATENT OFFICE 2,528,886

BEET TOPPING ATTACHMENT FOR TRACTORS

Taze W. Jones, Frederick, and George M. Loveland, Denver, Colo.; said Jones assignor to said Loveland Application March 20, 1948, Serial No. 16,016

6 Claims. (Cl. 56—121.4)

This invention relates to improvements in mechanical beet toppers and has reference more particularly to a mechanism adapted to be attached to a tractor, to be used for topping sugar beets preparatory to pulling and loading the same.

In many parts of the United States, the sugar beet crop is one of the principal crops, and it has heretofore been cultivated and harvested mainly by manual labor.

Many beet topping and harvesting machines have been invented and tested in the beet fields. Some of these have operated with indifferent success, but most of them are very large and expensive and have been found to have inherent in their construction defects that are highly objectionable.

Anyone familiar with the growing of sugar beets is aware that the beets in the same row are not all the same size. Some are larger than others and the large beets project above the surface of the ground to a greater extent than the smaller beets.

It is evident that any beet topping mechanism must be so constructed that it will automatically adjust itself to the height of the beets and do this in such a manner that it will not break the larger beets nor miss the smaller ones.

Where the beets vary considerably in size, some projecting to a much greater extent above the ground than the others, it is usual for the present beet topping mechanisms to break the larger beets, leaving half in the ground and discarding the upper half with the beet tops. Such harvesting machines are, of course, unprofitable for the beet raisers.

It is the object of this invention to produce a simple, substantial and comparatively light beet topping mechanism that can be attached to an ordinary farm tractor in such a way that two rows of beets can be topped simultaneously.

Another object of the invention is to produce a beet topper of such design that the danger of breaking the taller beets is reduced to a minimum and that at the same time the chance of passing over without topping the smaller beets is also reduced to a minimum.

Applicants are aware that beet toppers employing mechanisms that broadly resemble the mechanism shown in the drawing and described in this specification have previously been disclosed in patents and they do not claim to be the inventors of the machine shown, in its broadest aspect.

Applicants' invention relates more particularly to the specific construction by means of which this beet topping mechanism is adapted to be attached to the underside of an ordinary farm tractor and to be operated by power from the tractor which not only propels the mechanism along the rows, but also rotates the cutting disks.

The above and any other objects that may become apparent as this description proceeds are attained by means of a construction and an arrangement of parts that will now be described in detail and for this purpose reference will be had to the accompanying drawings in which the invention has been illustrated in its preferred form, and in which:

Figure 1 is a side elevation showing, in general outline, an ordinary farm tractor, the rear drive-wheel to the front of the view having been removed and the attachment to which this invention relates shown by shaded lines;

Figure 2 is a top plan view in which portions of the tractor have been indicated by broken lines to facilitate the description;

Figure 3 is a section taken on line 3—3, Figure 2; and

Figure 4 is a view partly in section taken on line 4—4, Figure 2.

Referring now to the drawing, the tractor has been designated in its entirety by the letter T. Particular parts thereof which become necessary for a proper description of the invention will be given appropriate reference numerals. The tractor is, of course, provided with the usual drive-wheels and, in this instance, the front wheels which have been designated by reference numeral 10 are positioned midway between the drive wheels in a manner quite common with farm tractors. However, it is to be understood that the tractor has merely been shown in outline so that the relation of the attachment thereto may be more readily understood. The rear axle housing has been designated by reference numeral 11 and this carries forwardly extending lugs 12. Farm tractors are usually provided with a transversely extending surface 13 to which cultivating instruments of various kinds may be attached. The invention or attachment to which this application relates consists of a frame comprising three frame members of angle iron. The side members have been designated by reference numeral 14 and the front transverse member by reference numeral 15. Frame member 15 is secured to the tractor by means of bolts 16. The side frame members 14 each comprise two angularly related portions, one of which has been designated by A and the other by B. The angle at the juncture of the two portions has been designated by reference numeral 17. It will be observed from Figure 1 that sections B extend upwardly and are secured by means of bolts 18 to lugs 12. Secured to the under surface of sections A are bearing blocks 19, in which is journaled a shaft 20. Secured to shaft 20, near one end thereof, is a sprocket wheel 21 to which power is transmitted from the power takeoff sprocket wheel 22, by means of a sprocket chain 23, in the manner shown in Figure 1. An idler 24 is usually provided and is preferably mounted for adjustment so as to facilitate the tensioning of sprocket chain. Supported at their front ends from shaft 20 are two identical topping mechanisms, each of which consists of two side frame members 25, each of which has an integral downwardly extending portion 26 that may project at right angles to member 25, but which preferably makes an obtuse angle therewith. A plate 27 is secured to the upper flanges of side members 25 by means of bolts 28 or rivets or they may even be welded thereto. Bearings 29 are secured to the front ends of frame members 25. The shaft is provided with a collar 30 positioned intermediate the two inner bearings 29 as shown in Figure 2. This collar, together with the end bearings 19, serve to hold the two frames from transverse movement. Other collars like those designated by reference numeral 31 may also be secured to the shaft, if found necessary, as it is essential that the frames do not have any appreciable movement longitudinally on shaft 20. Secured to shaft 20 are bevel gears 32. Frame members 25 are connected near their front ends by means of a plate 33. Plates 27 and 33 carry bearing blocks 34 and 35 in which shafts 36 are mounted for rotation. Each shaft 36 has secured to its front end a bevel pinion 37 that meshes with the corresponding pinion 32, and is provided at its rear end with a bevel pinion 38. Plates 39 and 40 connect the downwardly extending frame members 26. A bearing 41 is connected to each plate 39 and 40 and a shaft 42 is mounted for rotation in bearings 41 as shown most clearly in Figure 3. Secured to the lower end of shaft 42 is a cutting disk 32 and secured to the upper end of this shaft is a bevel gear 44 that is in mesh with gear 38 as shown most clearly in Figure 3. It will now be apparent that whenever shaft 20 and bevel gears 32 rotate, they will impart a corresponding rotation to shaft 36 and this, in turn, will cause shaft 42 and disk 43 to turn. Extending downwardly from frame members 25 are bars 45 whose lower ends are connected by a round bar or shaft 46. A gauge plate 47 is mounted on bar 46 which serves as a hinge pin and permits plate 47 to rock about the same as a pivot. The gauge plate has been shown as formed from two angularly related sections, the lower of which has been designated by reference numeral 48. A compression spring 49 is positioned in a housing 50 whose upper end is connected to the under side of plate 27 by means of a pivot 51. A plunger 52 extends into the lower end of housing 49 and has a collar that abuts the lower end of the spring. The lower end of the plunger 52 is connected to plate 47 by means of a pivot 53. This resilient mounting of plate 47 serves a purpose which will hereinafter appear. A bar 54 is pivoted at its ends to frame members 25 and has secured to it by welding or otherwise an angle iron 55 to which a lever 56 is attached. This lever extends upwardly and is provided with an opening 57 for convenience in attaching a rod or tension cord 58 thereto. Bar 54 has two downwardly extending rods 59 with short laterally extending hooks 60 that extend across the under side of adjacent frame members 25 in the manner shown in Figure 4. When bar 54 is rotated it moves end 60 upwardly in contact with the under surface of frame members 25 and serves to raise the frames and to hold them in elevated position during transportation.

Referring now more particularly to Figure 1 in which the untopped beets have been designated by reference numeral 61, it will be seen that as the tractor moves slowly towards the right, plate 47 comes in contact with the crown of the beet and lifts the frame member to which it is attached, thereby adjusting the position of the cutting disk 43 to the proper height for topping the beets. Where plate 47 comes in contact with a beet that is exceptionally high, plate 47 will yield, due to the resilient action of spring 49 and prevent the beet from being broken and at the same time it will move upwardly relative to the cutting disk because the latter and the frame to which it is attached have a considerable amount of inertia which produces a lag and in this manner a larger portion of the crown is cut from a high beet than from a small beet. This is an important feature of the construction because it is well known that if all of the beets are topped the same distance, the large beets will not have a sufficient amount of crown cut off and the small beets will have too much crown removed. With the automatic adjustment obtained by the pivoted guide plate, the depth of cut is varied in accordance with the height of the beet. Plunger 53 serves also as a stop for plate 47 limiting its downward movement relative to the cutting disk.

Having described the invention, what is claimed as new is:

1. A beet topping attachment for farm tractor comprising a support frame having two spaced parallel side members connected at one end by a transverse frame member, each side member having a bearing on its under surface, a shaft mounted for rotation in said bearings, the shaft extending across the frame at right angles to the side members, a topper frame comprising two spaced parallel side members, each provided with a bearing adjacent one end, the shaft projecting through the bearings forming a support for one end thereof, plates or the like, supported on and secured to the side members, two spaced bearings supported on said plates in axial alignment, one near each end of the frame, a shaft mounted for rotation in the bearings, a bevel gear secured to each end of said shaft, means for rotating the last named shaft comprising a bevel gear carried by the first shaft, the free ends of the last named side members having downwardly extending arms, means comprising a plate, or the like, for interconnecting the downwardly extending arms, two vertically spaced bearings secured to said arms in axial alignment, a shaft journaled in said last named bearings, the upper end of the last named shaft having a bevel gear in engagement with the bevel gear on the second named shaft whereby the three shafts will rotate in unison, a cutting disk secured to the lower end of the vertical shaft, a guide plate connected with the frame to the front of the cutting disk for rocking movement about a pivot positioned above the level of the cutting disk, said guide plate being downwardly ranging towards the cutting disk, and means for limiting the downward movement of said plate.

2. A beet topping attachment for farm tractor comprising a support frame having two spaced parallel side members connected at one end by a transverse frame member, each side member having a bearing on its under surface, a shaft mounted for rotation in said bearings, the shaft extending across the frame at right angles to the side members, a topper frame comprising two spaced parallel side members each provided with a bearing adjacent one end, the shaft projecting through the bearings forming a support for one end thereof, plate, or the like, supported on and secured to the side members, two spaced bearings supported on said plates in axial alignment, one near each end of the frame, a shaft mounted for rotation in the bearings, a bevel gear secured to each end of said shaft, means for rotating the last named shaft comprising a bevel gear carried by the first shaft, the free end of the frame having downwardly extending arms, means comprising a plate or the like for interconnecting the downwardly extending frame members, two vertically spaced bearings secured to said plates in axial alignment, a shaft journaled in said last named bearings, the upper end of the last named shaft having a bevel gear in engagement with the bevel gear on the second named shaft, whereby the three shafts will rotate in unison, a cutting disk secured to the lower end of the vertical shaft, a guide plate connected with the frame to the front of the cutting disk for rocking movement about a pivot positioned above the level of the cutting disk, said guide plate being downwardly ranging towards the cutting disk, means comprising a stop for limiting the downward movement of said guide plate, and resilient means for urging the guide plate against the stop.

3. A device in accordance with claim 1 in which there are two separate topping frames mounted for independent rocking movement.

4. A device in accordance with claim 2 in which means is provided for raising the free end of the topping frame and supporting it in inoperative position.

5. A beet topper attachment for a farm tractor, comprising; a frame adapted to be secured to the tractor, a horizontal shaft extending perpendicular to the direction of movement of the tractor and journaled for rotation on the frame, at least two topper frames pivotally connected at their forward ends to said shaft and extending in a direction rearwardly of said direction of movement, the topper frames being independently swingable in parallel vertical planes, an upwardly ranging shaft journaled to each of said topper frames for rotation about an axis fixed relative to a topper frame adjacent the rear end thereof, each shaft having a cutting disk affixed to its lower end each of the upwardly ranging shafts and a cutting disk affixed thereto being bodily swingable with the topper frame to which they are attached, about the axis of rotation of said horizontal shaft, power transmission means interconnecting each of said upwardly ranging shafts with the horizontal shaft, power transmission means connecting the horizontal shaft with a source of power on the tractor, a downwardly ranging plate carried by each of the topper frames adapted to engage the top of a beet in advance of the cutting disc to thereby control pivotal movement of the topper frame to which it is attached, each of the plates being pivoted to a topper frame, and resilient means interposed between each plate and topper frame adapted to control pivotal movement of the plate relative to the topper frame to which it is attached.

6. A beet topper attachment for a farm tractor, comprising; a frame adapted to be secured to the tractor, a horizontal shaft extending perpendicular to the direction of movement of the tractor and journaled for rotation on the frame, a topper frame pivotally connected at its forward end to said shaft and extending in a direction rearwardly of said direction of movement, an upwardly ranging shaft journaled to the topper frame for rotation about an axis fixed relative thereto, the upwardly ranging shaft and the topper frame being swingable as a unit in a vertical plane about the axis of rotation of said horizontal shaft, a cutting disk affixed to the lower end of the upwardly ranging shaft, power transmission means interconnecting the upwardly ranging shaft with the horizontal shaft, power transmission means connecting the horizontal shaft with a source of power on the tractor, a downwardly ranging member pivotally carried by the topper frame adapted to engage the top of a beet in advance of the cutting disk to thereby control pivotal movement of the topper frame, and resilient means interposed between said member and the topper frame adapted to control pivotal movement of said member relative to the topper frame.

TAZE W. JONES.
GEORGE M. LOVELAND.

REFERENCES CITED

The following references are of record in the file of this patent:

UNITED STATES PATENTS

| Number | Name | Date |
|---|---|---|
| 1,675,903 | Murphy | July 3, 1928 |
| 2,340,919 | Allen | Feb. 8, 1944 |
| 2,491,203 | Orelind | Dec. 13, 1949 |